United States Patent [19]

Losier

[11] Patent Number: 5,441,294

[45] Date of Patent: Aug. 15, 1995

[54] TOW HITCH

[76] Inventor: Gustave J. Losier, R.R. #2, Simcoe, Ontario, Canada, N3Y 4K1

[21] Appl. No.: 301,411

[22] Filed: Sep. 8, 1994

[51] Int. Cl.⁶ .............................................. B60D 1/14
[52] U.S. Cl. ................................. 280/491.4; 280/493; 280/495; 280/24; 180/182
[58] Field of Search ................................ 180/182, 190; 280/491.1, 491.2, 491.3, 491.4, 492, 493, 495, 24

[56] References Cited

U.S. PATENT DOCUMENTS

| | | | |
|---|---|---|---|
| 3,492,022 | 1/1970 | Hansen | 280/493 |
| 3,727,937 | 4/1973 | Maki, Jr. | 280/24 |
| 3,781,038 | 12/1973 | Bachel et al. | 280/493 |
| 3,797,846 | 3/1974 | Pevic | 280/24 |
| 4,799,711 | 1/1989 | Moore | 280/491.2 X |
| 4,856,799 | 8/1989 | Hawn | 280/491.4 X |

Primary Examiner—Eric D. Culbreth
Assistant Examiner—Victor E. Johnson
Attorney, Agent, or Firm—Jacobson, Price, Holman & Stern

[57] ABSTRACT

A pair of elongated hitch bar assemblies including first and second ends have their first ends universally mounted from the forward ends of front-to-rear extending toe braces of the forward skis of a snowmobile and the second ends thereof releasably anchored to the rear ends of the toe braces. When the hitch bar assembly second ends are released from the rear ends of the toe braces the hitch bar assemblies are swingable into generally horizontal forwardly convergent positions and the second ends of the hitch bar assemblies include structure for securing the second ends together and to a tow bar on the rear of a second snowmobile, the hitch bar assemblies being longitudinally extendable and retractable (extended when being used to tow a snowmobile and retraced when stored on the corresponding toe braces) and an adjustable length brace assembly being provided and secured to and extending between the longitudinal mid-portions of the hitch bar assemblies when the latter are extended and in the forwardly convergent positions thereof. A single hitch bar assembly, without a brace assembly may be carried by the toe brace of a uniski and utilized to tow the same.

12 Claims, 2 Drawing Sheets

TOW HITCH

BACKGROUND OF THE INVENTION

1. Field of the Invention

The instant invention relates to a tow hitch for use in towing one snowmobile behind another and incorporates a pair of elongated hitch bar assemblies each including first and second ends, the second ends being universally supported from the forward ends of the front to rear extending toe braces of a snowmobile and the second ends being releasably anchored relative to the rear ends of the corresponding toe braces. When the second ends of the hitch bar assemblies are released from the rear ends of the toe braces, they may be pivoted to forwardly convergent positions and releasably coupled together for pivotal attachment to the rear of a towing snowmobile and a two piece brace (each piece being carried by a respective hitch bar assembly) extends and is connected between the longitudinal mid-portions of the hitch bar assemblies.

2. Description of Related Art

Various different forms of tow hitches including some of the general structural and operational features of the instant invention and including tow hitches specifically adapted for use in conjunction with snowmobiles heretofore have been provided.

Examples of these previously known forms of tow hitches are disclosed in U.S. Pat. Nos. 3,727,937, 3,781,083, 3,797,846 and 4,856,799. However, these previously known forms of tow hitches are not operable to be stored in inactive positions upon the forward toe braces of snowmobile skis and therefore require a storage area on a snowmobile which otherwise may be utilized more efficiently and to carry safety equipment other than a tow bar.

SUMMARY OF THE INVENTION

The tow bar of the instant invention comprises a pair of elongated members or hitch bar assemblies which, when in operation, are forwardly convergent and have their rear ends anchored relative to the forward end portions of the toe braces of a snowmobile to be towed. The forward ends of the forwardly convergent elongated members are removably joined together and may be pivotally attached to the rear of a snowmobile which is to be used to perform the towing operation. Furthermore, a transverse brace extends between and is anchored to the longitudinal mid-portions of the elongated members or hitch bar assemblies.

The elongated members of the tow hitch each may be longitudinally extended to operative positions and retracted to shortened inactive positions. The elongated members include first ends which are universally anchored to the forward ends of the toe braces of an associated snowmobile and second ends which are removably anchored to the rear ends of the associated toe braces when in the inactive stored positions.

When the stored elongated members or hitch bar assemblies are to be utilized, the second ends thereof are released from the rear ends of the associated toe braces and the elongated members are pivoted toward forwardly convergent positions and also extended from the shortened inactive positions to the lengthened active positions. The second ends thereof are then removably coupled together for pivotal attachment to the rear of a towing snowmobile. Also, each of the elongated members has a brace end portion pivotally anchored thereto and when the elongated members are in the forwardly convergent active positions the brace end portions are swung toward each other into end overlapped engagement and secured together to form a rigid brace between the longitudinal mid-portions of the elongated members.

Also, a single hitch bar assembly or elongated member may be used to tow a "uniski" and the material of which the tow hitch is constructed will be durable and rust proof.

The main object of this invention is to provide a tow hitch for a snowmobile which will be effective in providing a towing hitch between the rear of an operative snowmobile and the front of a disabled snowmobile.

Another very important object of this invention is to provide a tow bar assembly in accordance with the preceding object and constructed in a manner for ready storage from the front end portions of the front skis of a snowmobile, thereby freeing all other storage areas of a snowmobile for storing other equipment.

A further object of this invention is to provide a snowmobile tow hitch or tow bar assembly specifically designed to be stored from the front toe braces of the front skis of the snowmobile.

Another important object of this invention is to provide a snowmobile tow hitch or tow bar assembly constructed in a manner for support from substantially any snowmobile whose front skis are equipped with toe braces.

Yet another important object of this invention is to provide a snowmobile tow bar assembly anchorable to the forward toe braces of the skis of a snowmobile and to a towing snowmobile in a manner such that the snowmobile being towed will track substantially directly behind the towing snowmobile.

A final object of this invention to be specifically enumerated herein is to provide a snowmobile towing hitch or tow bar assembly in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
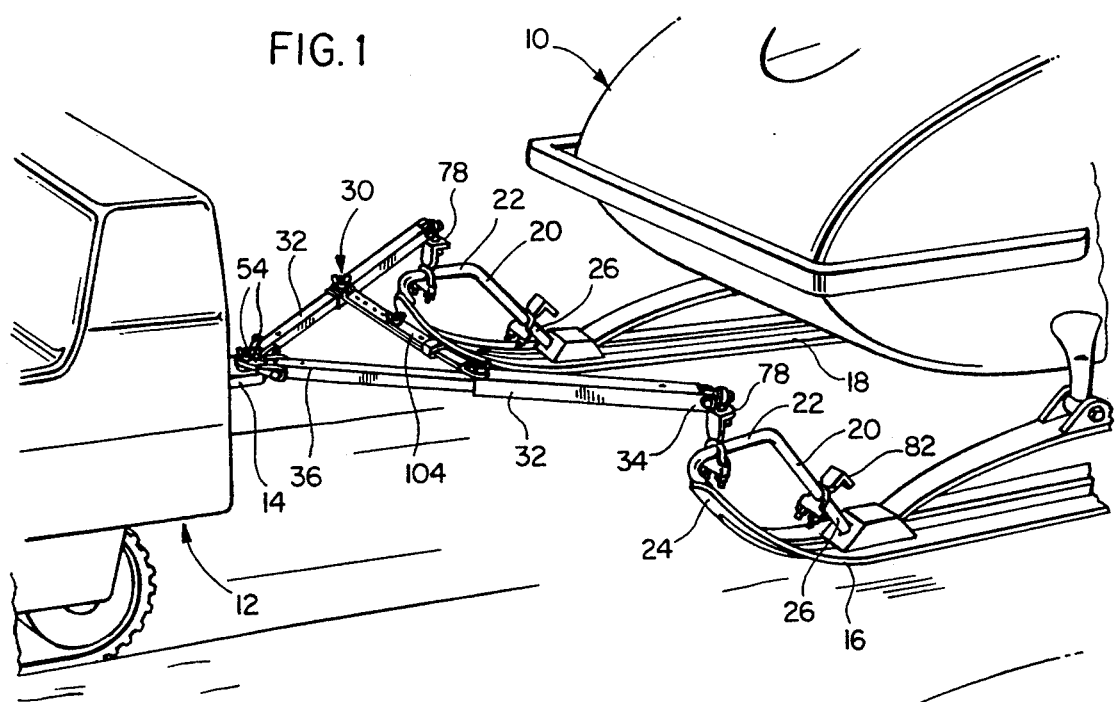
FIG. 1 is a perspective view of the preferred form of toe hitch constructed in accordance with the present invention and in use towing a disabled snowmobile from the rear of an operative snowmobile.

Referring now more specifically to the drawings 10 generally designates a disabled snowmobile and 12 generally designates an operative snowmobile including a rearwardly projecting tow bar 14.

The snowmobile 10 includes a pair of forward, opposite side dirigible skis 16 and 18 each equipped with a forward toe brace 20, the toe braces 20 each including a forwardly and downwardly inclined forward end 22 anchored relative to the corresponding ski tip 24, and a rearwardly and downwardly inclined rear end 26 anchored relative to the corresponding forward spring anchor 28.

Figure 2:
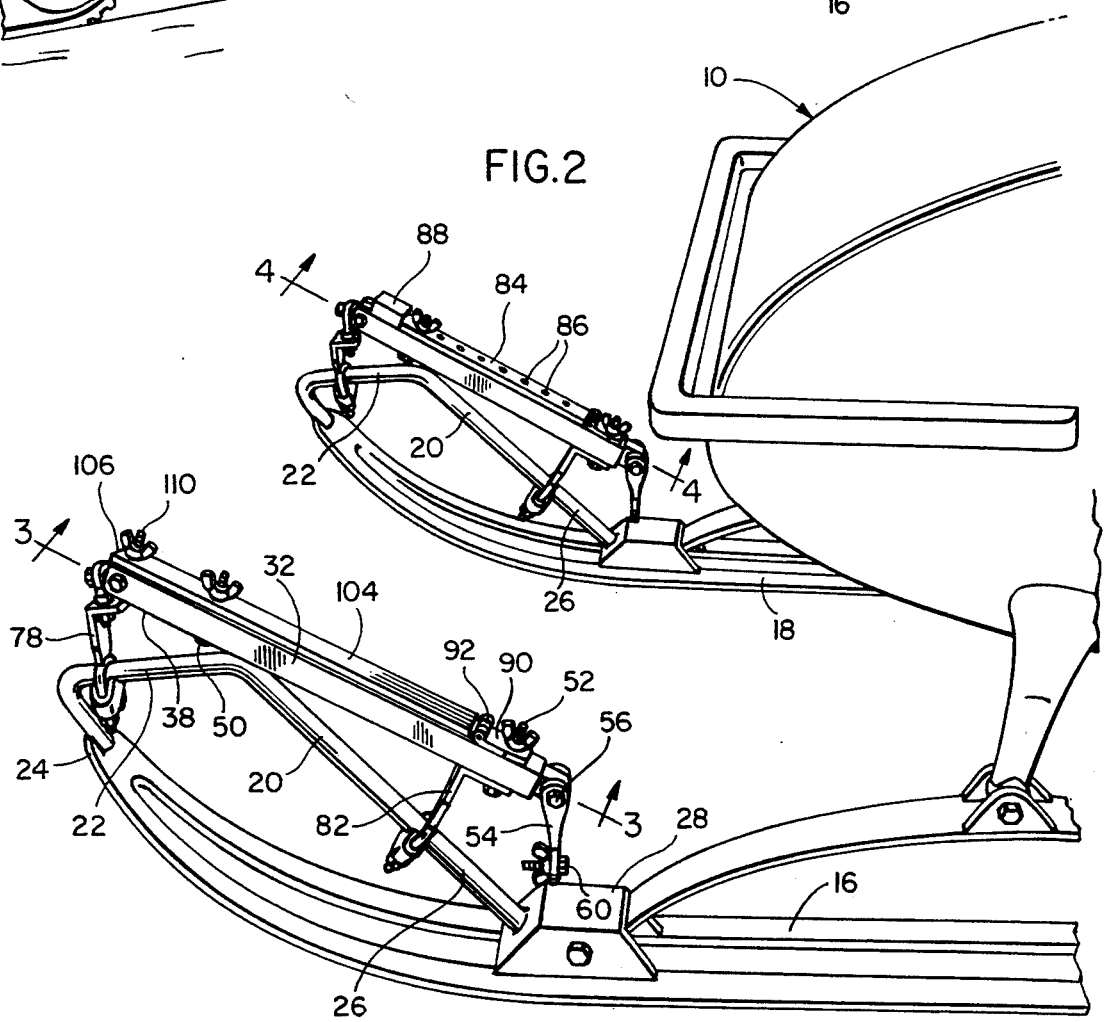
FIG. 2 is a fragmentary perspective view of the front of a typical form of snowmobile and with the components of the preferred form of tow hitch mounted from the toe braces of the skis of a snowmobile in stored positions.
Figure 3:
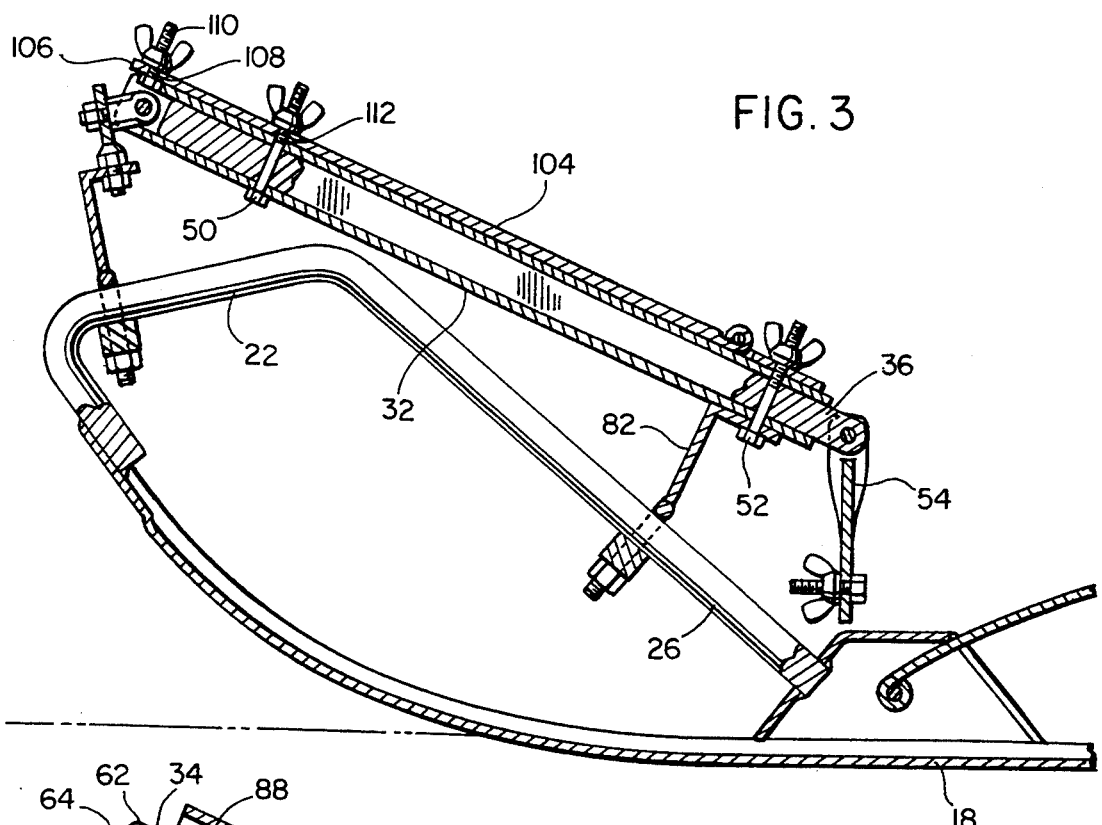
FIG. 3 is an enlarged fragmentary vertical sectional view taken substantially upon the plane indicated by the section line 3—3 of FIG. 2.
Figure 4:
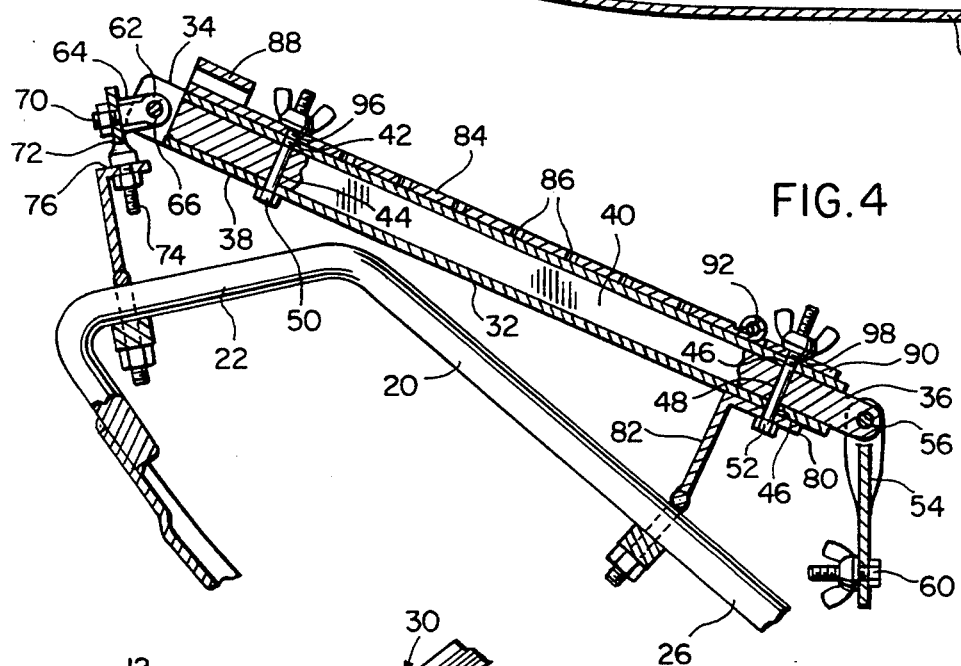
FIG. 4 is an enlarged fragmentary vertical sectional view taken substantially upon the plane indicated by the section line 4—4 of FIG. 2.
Figure 5:
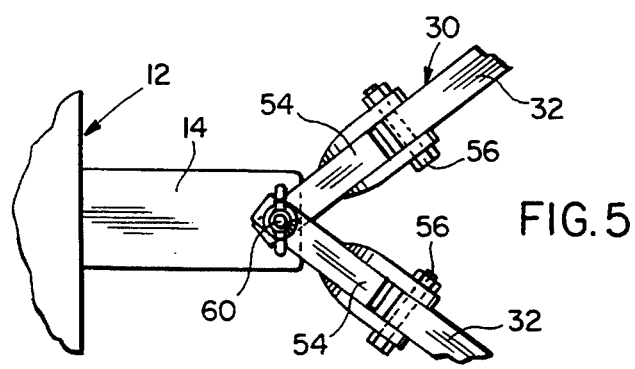
FIG. 5 is a fragmentary enlarged top plan view illustrating the manner in which the forward portion of the tow hitch is attached to the rear tow bar of a towing snowmobile.

The preferred form of tow hitch of the instant invention is referred to in general by the reference numeral 30, see FIGS. 2-4, and includes a pair of elongated, longitudinally extendable hitch bar assemblies or elongated members 32 including first ends 34 and second ends 36.

Each hitch bar assembly 32 includes a first elongated tubular member 38 which defines the first end 34 and a second elongated rod-like member 40 which defines the second end 36, the rod-like member 40 being substantially fully telescoped within the tubular member 38 when the hitch bar assembly 32 is in a longitudinally shortened position such as that illustrated in FIGS. 2, 3 and 4.

Each tubular member 38 includes a first pair of aligned transverse bores 42 which are registered with a first transverse bore 44 formed in the corresponding member 40 and a second pair of aligned transverse bores 46 aligned with a second transverse bore 48 formed in the corresponding member 40, threaded shank type fasteners 50 and 52 being removably secured through the registered bores 42, 44 and the registered bores 46, 48, respectively.

An elongated tongue 54 is bifurcated at one end and pivotally attached to the second end 36 as at 56 and the other end of the tongue 54 is flat and has an aperture 58 formed therethrough with a threaded fastener 60 secured through the aperture 58 for a purpose to be hereinafter more fully set forth.

The first end 34 is defined by a bifurcated end on the corresponding tubular member 38 and pivotally supports the cross head 62 of a T-fitting 64 therefrom as at 66, the leg 70 of the T-fitting 64 being externally threaded and secured through an anchor eye 72 including a threaded shank portion 74 releasably secured through an apertured upper flange portion 76 of an inverted L-shaped bracket 68 removably clampingly supported from the forward end 22 of the corresponding toe brace 20. In addition, the fastener 52 is also removably secured through the horizontal flange 80 of a second inverted L-shaped bracket 82 removably clampingly supported from the rear end 26 of the associated toe brace 20, see FIG. 4.

In addition to the tubular members 38 and the rod-like members 40, one of the hitch bar assemblies or elongated members 32 supports a first elongated brace member end portion 84 therefrom. The elongated brace member end portion 84 is in the form of an elongated strap member having a plurality of longitudinally spaced adjustment bores 86 formed therethrough, an integral sleeve portion 88 at one end portion and a hinge leaf 90 pivotally supported from the other end portion as at 92, see FIG. 4. The end portion 84 also is equipped with a bore 96 through which the fastener 50 is secured and the hinge leaf 90 is equipped with a similar bore 98 through which the fastener 52 is secured. In this manner, one of the elongated hitch bar assemblies 32 is releasably supported in a longitudinally foreshortened condition from one of the toe braces 20 (the toe brace 20 of the ski 18).

Further, and with attention now invited more specifically to FIG. 3, the second elongated hitch bar assembly 32 supported from the toe brace 20 of the ski 16 includes a second brace member end portion 104 which is similar to the brace member end portion 84 and is supported from the corresponding hitch bar assembly 32 in substantially the same manner as the brace member end portion 84 is supported from the hitch bar assembly 32 mounted from the ski 16. However, the brace member end portion 104 includes an extended end 106 having an aperture 108 formed therethrough and an adjustment bolt 110 is removably secured through the aperture 108, the brace member end portion 104 not including a sleeve portion corresponding to the sleeve portion 88.

With attention now invited more specifically to FIGS. 1, 3 and 4 of the drawings, when it is desired to utilize the tow hitch 30, the bolts 50, 52 and 110 are removed from both of the hitch bar assemblies 32 and the second ends 36 thereof are swung toward generally horizontal forwardly convergent positions. The rod-like members 40 are thereafter extended forwardly from the tubular members 38 until such time as the bores 44 are registered with the bores 46 and at that time the bolts 52 are reinstalled through the aligned bores 44 and 46 and through the hinge leaves 90.

Thereafter, the end of the brace member end portion 104 remote from the corresponding hinge leaf 98 is threaded through the sleeve portion 88 and the bore 112 formed in the brace member end portion 104 is registered with one of the adjustment bores 86 such that the apertures 58 in the free ends of the tongues 50 may be registered with each other and receive one of the threaded fasteners 60 therethrough, the threaded fastener 60 also being secured through the tow bar 14 at the rear of the snowmobile 12. The extra threaded fastener 60 is not used and is therefore removed and retained as a spare and the threaded bolts 50 also are unused, but retained in order that the hitch bar assemblies 32 again may be stored in the manner illustrated in FIG. 2 of the drawings after the towing operation is completed.

Figure 6:
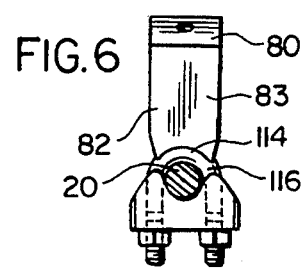
FIG. 6 is an elevational view illustrating one of the rear mounting brackets utilized to mount one of the hitch bar assemblies to the corresponding toe brace rear end, the associated toe brace being illustrated in cross section.

As may be seen from FIG. 6, the brace 82 comprises an inverted L-shaped bracket which has the lower end of the long leg 83 thereof welded to the bight portion 114 of the U-bolt 116 of a clamp tightened on the rear end 26 of the corresponding toe brace 20, the brackets 78 being similarly formed.

During a towing operation the hitch bar assemblies 32 may be inclined up to 45° rearwardly and downwardly relative to the hitch bar 14 and as much as 45° relative to the snowmobile being towed, thereby enabling the two snowmobiles to be relatively angularly displaced 90° about a horizontal transverse axis. Furthermore, the adjustability of the brace member end portions 84 and 104 enables the tow hitch 30 to be secured to the toe braces of the front skis of a snowmobile which are spaced different distances apart and the ability of the hitch bar assemblies 32 to be shortened to slightly more than one half their operative lengths enables the hitch bar assemblies to be stored in inoperative positions on the toe braces of snowmobile front skis without interference with normal operation of the snowmobile. This of course frees any storage compartments on a snowmobile for storage of other equipment and yet enables a snowmobile to always have a tow bar mounted in position thereon for quick extension, bracing and securement to a towing snowmobile in an emergency situation.

It also is pointed out that the free ends of the bolts 50 and 52 as well as the free ends of the fasteners 62 may be provided with diametric bores and retaining clips (not shown) passed through those diametric bores to prevent loss of the bolts 50 and 52 and the fasteners 60 due to vibration during operation of the snowmobile 10.

The foregoing is considered as illustrative only of the principles of the invention. Further, since numerous modifications and changes readily will occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a snowmobile including a pair of front, opposite side dirigible skis each including an upwardly curving toe portion and an elongated toe brace including a forward end anchored to a tip of the corresponding toe portion and a rear end anchored to the corresponding ski rearward of the toe portion, a pair of elongated members having first and second ends, mounting means pivotally mounting each of said first ends to a forward end of a corresponding toe brace and anchor means releasably anchoring each of said second ends to the corresponding toe brace rear end with each elongated member supported in an inactive stored position from the corresponding toe brace, said mounting means including means enabling said elongated members, when said second ends are released from said rear ends, to be swung relative to said braces into forwardly convergent active positions with said second ends forwardmost and allowing angular displacement of said first ends relative to said toe braces about an axis extending between said forward ends, said second ends including means for releasably securing said second ends together when said elongated members second ends are forwardly convergent, said second ends, when releasably secured together, being adapted for pivotal connection with the rear of a towing vehicle disposed forward of said second ends.

2. The combination of claim 1 wherein said elongated members are longitudinally extendable between retracted shortened conditions and extended lengthened conditions and include means operative to releasably retain said elongated members in said lengthened conditions, said elongated members being shortened when in the inactive positions thereof and lengthened when in the active positions thereof.

3. The combination of claim 2 including brace means extending between and releasably connecting generally longitudinal mid-portions of said elongated members when the latter are in the active positions thereof.

4. The combination of claim 3 wherein said brace means includes a pair of opposite end members having adjacent relatively overlapped ends interconnected for relative extension and retraction, said brace means including adjustment means operative to releasably retain said end members in adjusted extended positions.

5. The combination of claim 4 wherein said end members are separably joined together and each is pivotally supported from a corresponding elongated member for swinging relative thereto between an inactive position extending toward and releasably engageable with the corresponding second end of the corresponding elongated member and an active position angulated relative to the corresponding elongated member and extending toward the general longitudinal mid-portion of the other elongated member when the latter is extended and in the active position thereof.

6. The combination of claim 1 including brace means extending between and connecting generally longitudinal mid-portions of said elongated members when the latter are in the active positions thereof.

7. The combination of claim 6 wherein said brace means includes a pair of opposite end members having adjacent relatively overlapped ends releasably interconnected for relative extension and retraction, said brace means including adjustment means operative to releasably retain said end members in adjusted extended positions.

8. In combination with a snowmobile having two laterally spaced forward skis each equipped with a forward toe brace extending longitudinally therealong and having front and rear end portions, a tow hitch including a pair of elongated hitch bar assemblies each having first and second ends, mounting means universally mounting each of said first ends to the corresponding toe brace front end portion, anchor means releasably securing each of said second ends to the corresponding toe brace rear end portion, said second ends, when released from said rear end portions, being swingable relative to said toe braces into forwardly convergent, generally horizontal positions, and hitch means for releasably securing said second ends together, when in said forwardly convergent positions, and adapted for releasable towing coupling to the rear of a leading snowmobile.

9. The combination of claim 8 including brace means extending between and connecting generally longitudinal mid-portions of said hitch bar assemblies when the latter are in their forwardly convergent positions.

10. The combination of claim 9 wherein said brace means includes a pair of opposite end members having adjacent relatively overlapped ends releasably interconnected for relative extension and retraction, said brace means including adjustment means operative to releasably retain said end members in adjusted extended positions.

11. The combination of claim 10 wherein said end members are separably joined together and each is pivotally supported from a corresponding hitch bar assembly for swinging relative thereto between an inactive position extending toward and releasably engageable with the corresponding second end of the corresponding hitch bar assembly and an active position angulated relative to the corresponding hitch bar assembly and extending toward the general longitudinal mid-portion of the other hitch bar assembly when the latter is extended and in the active position thereof.

12. In combination a snow vehicle including at least one forward ski including an upwardly curving toe portion and an elongated brace including a forward end anchored to a forward tip of said toe portion and a rear end anchored to said ski rearward of said toe portion, an elongated member having first and second ends, mounting means universally mounting said first end of said elongated member to said forward end of said brace and anchor means releasably anchoring said second end of said elongated member to said rear end of said brace, said mounting means including means enabling said elongated member, when said second end is released from said rear end, to be swung relative to said toe brace into a forwardly directed position, said second end including means adapted for universal connection with the rear of a towing vehicle disposed forward of said second end.

* * * * *